United States Patent
Kwak et al.

(10) Patent No.: US 12,069,719 B2
(45) Date of Patent: Aug. 20, 2024

(54) CHANNEL OCCUPANCY TIME INDICATION FOR NR BASED UNLICENSED OPERATION

(71) Applicant: Apple Inc., Cupertino, CA (US)

(72) Inventors: Yongjun Kwak, Portland, OR (US); Lopamudra Kundu, Sunnyvale, CA (US); Bishwarup Mondal, San Ramon, CA (US); Dae Won Lee, Portland, OR (US)

(73) Assignee: Apple Inc., Cupertino, CA (US)

( * ) Notice: Subject to any disclaimer, the term of this patent is extended or adjusted under 35 U.S.C. 154(b) by 527 days.

(21) Appl. No.: 17/290,281

(22) PCT Filed: Nov. 1, 2019

(86) PCT No.: PCT/US2019/059451
§ 371 (c)(1),
(2) Date: Apr. 30, 2021

(87) PCT Pub. No.: WO2020/092941
PCT Pub. Date: May 7, 2020

(65) Prior Publication Data
US 2022/0022248 A1    Jan. 20, 2022

Related U.S. Application Data (60) Provisional application No. 62/755,341, filed on Nov. 2, 2018.

(51) Int. Cl.
*H04W 74/00* (2009.01)
*H04W 74/0808* (2024.01)

(52) U.S. Cl.
CPC ..... *H04W 74/006* (2013.01); *H04W 74/0808* (2013.01)

(58) Field of Classification Search
CPC ............ H04W 74/006; H04W 74/0808; H04L 5/0044; H04L 5/0096
See application file for complete search history.

(56) References Cited

U.S. PATENT DOCUMENTS 10,595,335 B2 *  3/2020  Jung ..................... H04L 5/1469
2013/0016655 A1  1/2013  Heo et al.
(Continued)

FOREIGN PATENT DOCUMENTS

| CN | 106658739 | 5/2017 |
| CN | 107889114 | 4/2018 |
| WO | WO-2018071853 A1 * | 4/2018 |

OTHER PUBLICATIONS

Samsung, "Downlink Signal and Channel Design for NR-U", 3GPP TSG RAN WG1, Meeting #94bis, R1-1811800, Oct. 2018, Chengdu, China, 7 pgs.
(Continued)

*Primary Examiner* — Chae S Lee
(74) *Attorney, Agent, or Firm* — Kowert, Hood, Munyon, Rankin & Goetzel, P.C.

(57) ABSTRACT

Devices and methods of providing channel occupancy time (COT) are described. After a gNB acquires an unlicensed channel for a COT, the gNB indicates the COT length to a UE using a PDCCH having a DCI formed in accordance with DCI format 2_0. The slot format of the last slot of the COT is indicated using a reserved slot format indicator that is reserved to indicate the end of the COT. The reserved slot format indicator indicates a last slot format of available slot formats of DCI format 2_0. Dummy bits fill the DCI after the reserved slot format indicator. Alternatively, to indicate the COT length, a COT field dedicated to providing the COT is used in the DCI or the CRC is masked using a slot format indication Radio Network Temporary Identifier.

17 Claims, 7 Drawing Sheets

(56) References Cited

U.S. PATENT DOCUMENTS

2014/0341143 A1     11/2014  Yang et al.
2020/0045696 A1*     2/2020  Huang ..................... H04L 5/10
2021/0298072 A1*     9/2021  Oh ....................... H04W 74/006
2021/0368484 A1*    11/2021  Xu ....................... H04L 5/0032
2021/0385831 A1*    12/2021  Nogami ................ H04W 72/23

OTHER PUBLICATIONS

Sony, "Considerations on Frame Structure for NR Unlicensed Operations", 3GPP TSG RAN WG1, Meeting #94bis, R1-1810631, Oct. 2018, Chengdu, China, 5 pgs.

Asustek, "Discussion on Frame Structure for NR-U Operation", 3GPP TSG RAN WG1, Meeting #94bis, R1-1811473, Oct. 2018, Chengdu, China, 2 pgs.

International Search Report and Written Opinion for International Application No. PCT/US2019/059451, mailed Feb. 25, 2020, 10 pgs.

Office Action for CN Patent Application No. 201980072312.4; Dec. 20, 2023.

* cited by examiner

CHANNEL OCCUPANCY TIME INDICATION FOR NR BASED UNLICENSED OPERATION

This application is a U.S. National Stage filing of International Application No. PCT/US2019/059451, filed Nov. 1, 2019, which claims the benefit of priority to U.S. Provisional Application No. 62/755,341, filed Nov. 2, 2018. Each of the aforementioned Applications is incorporated herein by reference in its entirety.

TECHNICAL FIELD

Embodiments pertain to radio access networks (RANs). Some embodiments relate to cellular networks, including Third Generation Partnership Project (3GPP) Long Term Evolution (LTE), $4^{th}$ generation (4G) and $5^{th}$ generation (5G) New Radio (NR) (or next generation (NG)) networks. Some embodiments relate to unlicensed band use in such networks. Some embodiments relate to channel occupancy time (COT) when the unlicensed band is used.

BACKGROUND

The use of various types of systems has increased due to both an increase in the number and types of user equipment (UEs) using network resources as well as the amount of data and bandwidth being used by various applications, such as video streaming, operating on these UEs. Bandwidth, latency, and data rate enhancement may be used to deliver the continuously-increasing demand for network resources. The next generation wireless communication system will provide ubiquitous connectivity and access to information, as well as ability to share data, by various users and applications. NG systems are expected to have a unified framework in which different and sometimes conflicting performance criteria and services are to be met. In general, NR will evolve based on 3GPP LTE-Advanced technology with additional enhanced radio access technologies (RATs) to enable seamless wireless connectivity solutions. An increasing number of these solutions involve the issue of the massive increase in number of UEs in use. In particular, a number of developments have focused on the use of the unlicensed spectrum to provide additional communication channels with which the eNBs/gNBs and UEs communicate.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
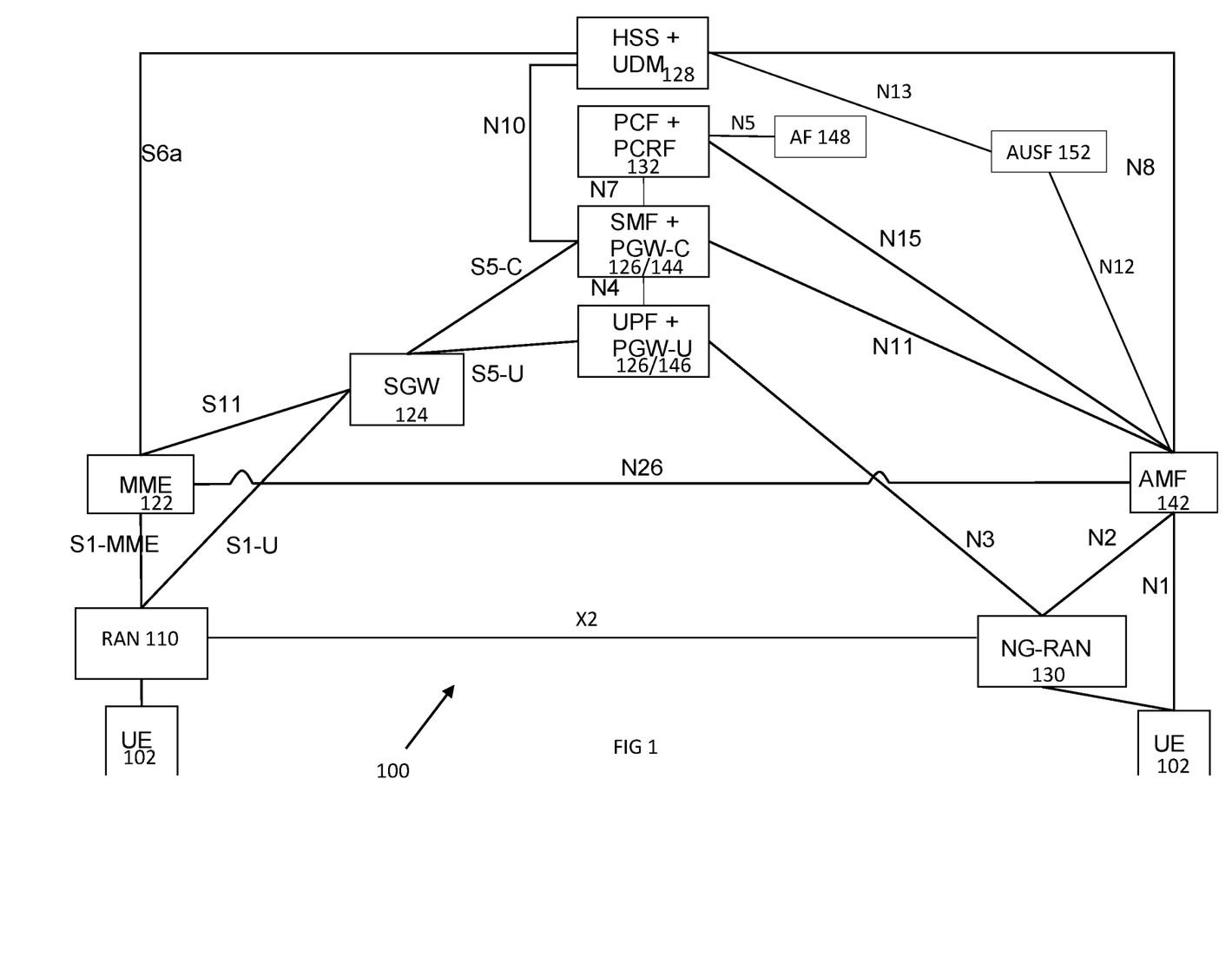
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or radio access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 146 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
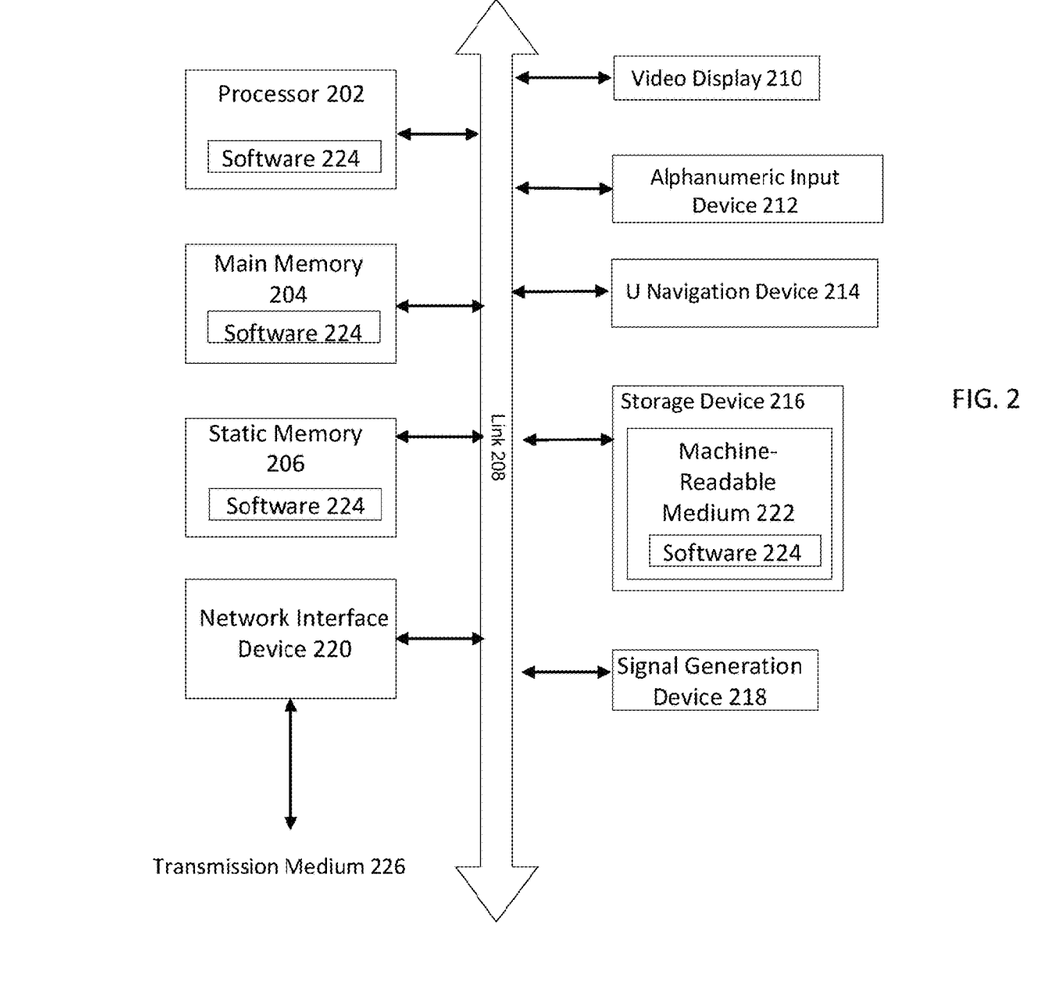
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the 4G/LTE or NG network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication-based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), a narrowband IoT (NB-IoT) device, or a non-IoT device (e.g., smart phone, vehicular UE), any which may communicate with the core network via the eNB or gNB shown in FIG. 1. The communication device 200 may be an autonomous or semiautonomous device that performs one or more functions, such as sensing or control, among others, in communication with other communication devices and a wider network, such as the Internet. If the communication device 200 is IoT device, in some embodiments, the communication device 200 may be limited in memory, size, or functionality, allowing larger numbers to be deployed for a similar cost to smaller numbers of larger devices. The communication device 200 may, in some embodiments, be a virtual device, such as an application on a smart phone or other computing device.

As above, UEs typically operate in the licensed spectrum. However, the increasing scarcity of licensed spectrum in LTE and NR frequency bands due to the explosion of UEs may result in insufficient bandwidth to supply all UEs in a network for communication. This may lead to, among other things, a reduction in data throughput and a reduction in communication quality. To ameliorate this issue, NR (and LTE) systems may operate in the unlicensed spectrum (called NR-unlicensed or NR-U). Potential NR operation in unlicensed spectrum includes, but is not limited to, Carrier Aggregation (CA) based on Licensed Assisted Access (LAA)/enhanced LAA (eLAA) systems, NR operation in the unlicensed spectrum via dual connectivity (DC), and standalone NR (in which the NR networks may or may not be supported by a 4G structure) (SA) modes of network operation.

A channel access mechanism is used for any deployment options of NR-unlicensed. Generally, communication devices may contend for access to the unlicensed frequency band by performing clear channel assessment (CCA) and Listen-Before-Talk (LBT) procedures, and subsequently transmitting during transmission opportunities (TxOPs). The LBT-based channel access mechanism may fundamentally resemble the WLAN's Carrier Sense Multiple Access with Collision Avoidance (CSMA/CA) principles. Any node that intends to transmit in unlicensed spectrum first performs a channel sensing operation before initiating any transmission. Depending on the LBT category, an additional random back-off mechanism may be adopted to avoid collisions when more than one node senses the channel as idle and transmits simultaneously.

That is, when using NR-unlicensed, communication devices such as base stations (gNBs) and UEs may determine channel availability via energy detection before transmitting data on the channel. For example, the communication device may determine that the channel is occupied through a predetermined amount of energy being present in the channel or via a change in a received signal strength indication (RSSI). The communication device may detect the presence of a specific sequence, such as a preamble transmitted prior to a data transmission, that indicates use of the channel. The unlicensed channel may be reserved using a reservation signal to prevent WiFi signals from initiating transmission until the next frame boundary event.

In NR-Unlicensed, the transmitter device can transmit its data payload by engaging in LBT and acquiring a Channel Occupancy Time (COT), where the transmitter device can use the time resource inside the COT by transmitting its own data payload or share the resource with other devices. The maximum COT may depend on the data being transmitted (up to a maximum of 8 or 10 ms). In some embodiments, if a gNB acquires a COT, the gNB may use the entire resource inside the COT. Therefore, the other devices that can receive the DL gNB signal (e.g., unicast or broadcast) cannot transmit any data during the COT unless the gNB shares the COT with the other devices. It may thus be beneficial for the gNB to indicate the COT information to other devices (e.g., UEs). Such an indication may include the length of the COT or how to share the COT with other devices, so that the other devices are able to sleep during the COT, or can transmit if the COT is shared by the gNB with one or more of the other devices.

In some cases, the Downlink Control Information (DCI), specifically DCI format 2_0, may be used to indicate the COT. DCI format 2_0 was originally designed for indicating the slot format to a group of UEs, but may instead be used for the indication of COT with some format modifications. DCI format 2_0 may be transmitted via a physical downlink control channel (PDCCH) for a set of UEs in a cell. The PDCCH may indicate at least the slot format related information, i.e., which symbols in a slot are used for DL (D), UL (U), or flexible (X).

Figure 3:
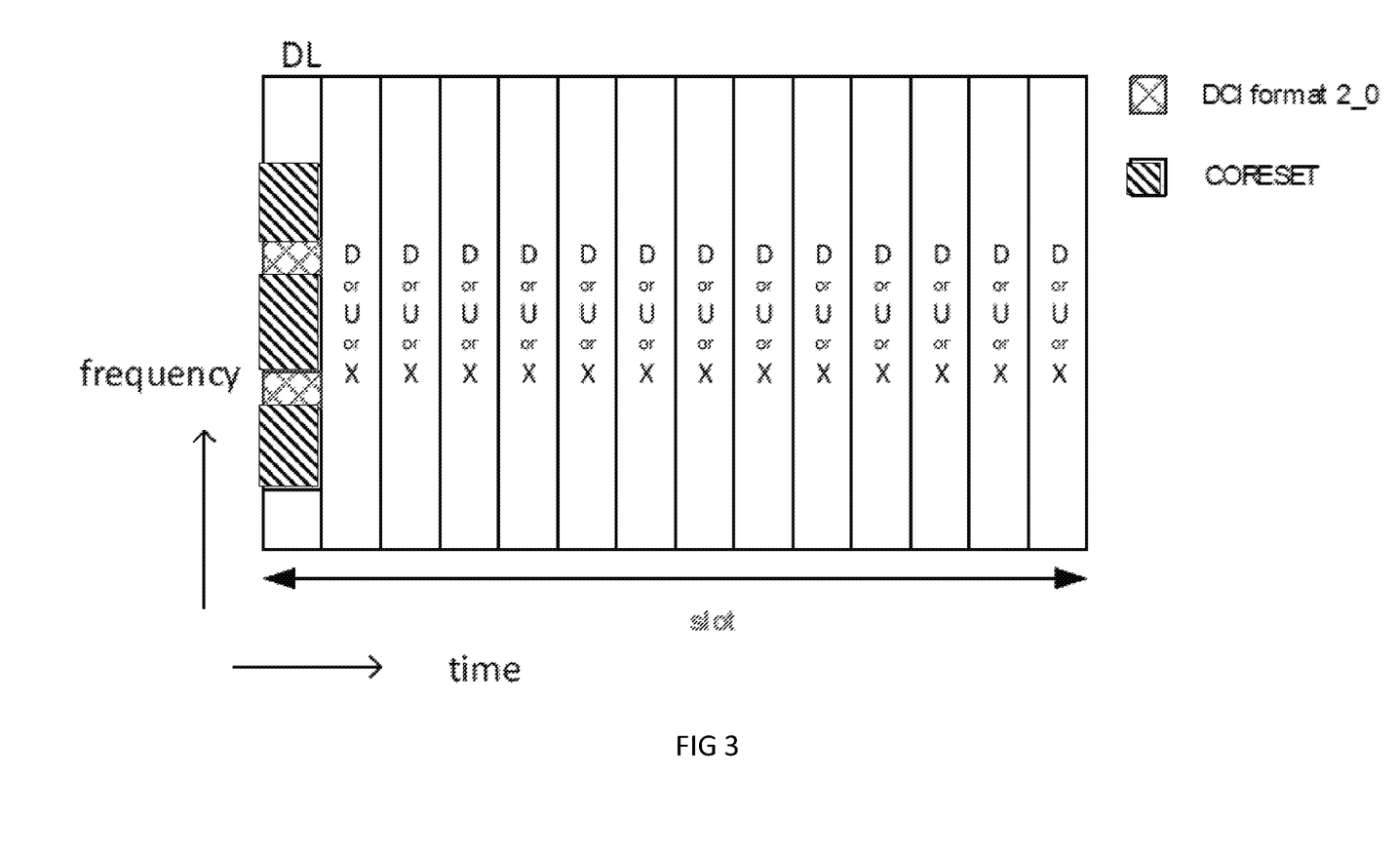
FIG. 3 illustrates a downlink control index (DCI) format 2_0 inside control resource set in accordance with some embodiments.

FIG. 3 illustrates a DCI format 2_0 inside control resource set in accordance with some embodiments. Specifically, FIG. 3 shows the resource allocation for DCI format 2_0 for NR. The control resource set (CORESET) is configured in particular time frequency resources. As shown, the CORESET and DCI may be configured in multiple frequency resources within the first symbol of a particular slot. The remaining symbols in the time domain may be, as above, D, U, or X symbols. Inside the common PDCCH recourse set, the DCI format 2_0 may be transmitted using a PDCCH in which the cyclic redundancy check (CRC) is masked with the slot format indication radio network temporary identifier (SFI-RNTI).

Figure 4:
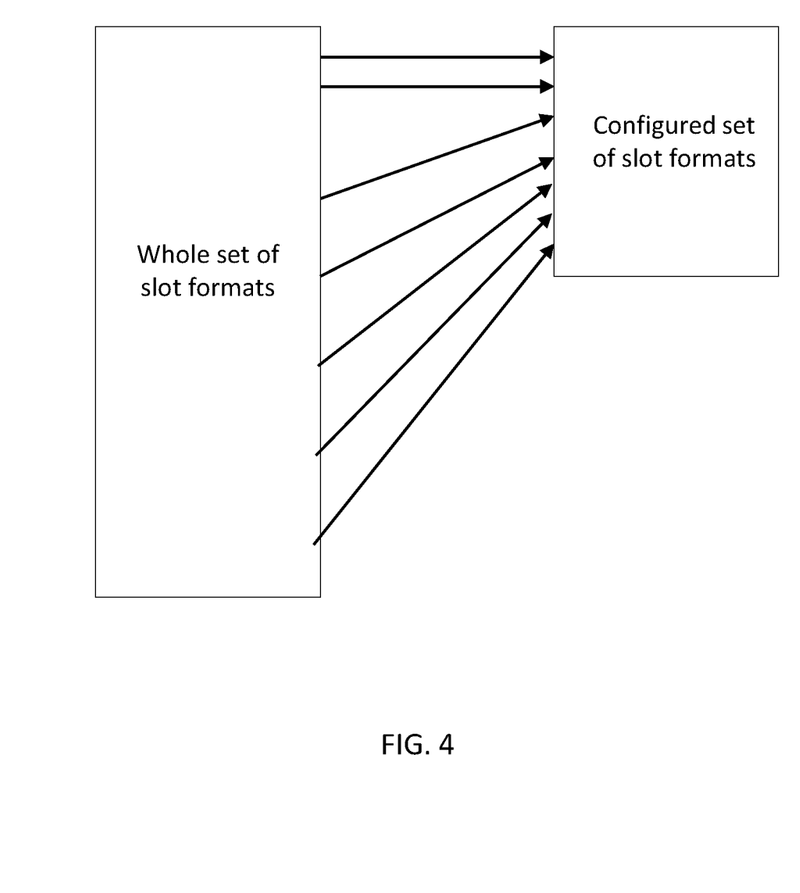
FIG. 4 illustrates a slot format configuration in accordance with some embodiments.

The details of DCI format 2_0 may be configured by higher layer signaling. These details may include the length of the DCI size, how many formats are supported and how often DCI format 2_0 is to be monitored by the UE. For the possible format indication by DCI format 2_0, the gNB can choose a limited number of slot formats that are most desirable and potentially useful for its system and then configure the set of the chosen slot formats from a whole set of formats for the group of UEs or all UEs in a cell using higher layer signaling. FIG. 4 illustrates a slot format configuration in accordance with some embodiments. By configuring the DCI size and the size of set of formats, the number of slots whose formats are indicated by DCI format 2_0 may be determined.

Figure 5:
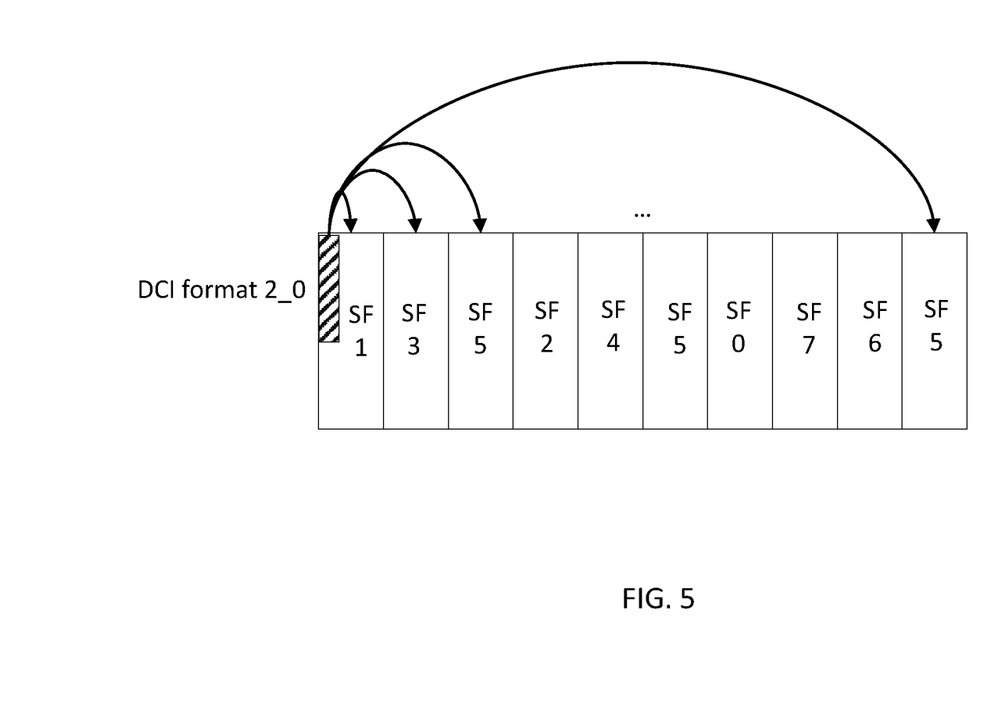
FIG. 5 illustrates a DCI format 2_0 indication in accordance with some embodiments.

For example, if the DCI format 2_0 size is configured as 30 and 8 formats are configured, then 1 format may use 3 bits. In this case, the DCI format 2_0 can indicate slot formats of 10 consecutive slots from the slot in which the DCI format 2_0 is transmitted. FIG. 5 illustrates a DCI format 2_0 indication in accordance with some embodiments.

The size for DCI format 2_0 may be semi-statically configured by higher layer. The candidate size can be from 12 to 128 bits. Therefore, if the DCI format 2_0 is configured and the same size of the information is used, then DCI format 2_0 may always indicate slot formats for the same number of slots. However, if DCI format 2_0 is used for the indication of the COT, the DCI format 2_0 indicates the size of the COT, which is not supported by the current DCI format 2_0.

Figure 6:
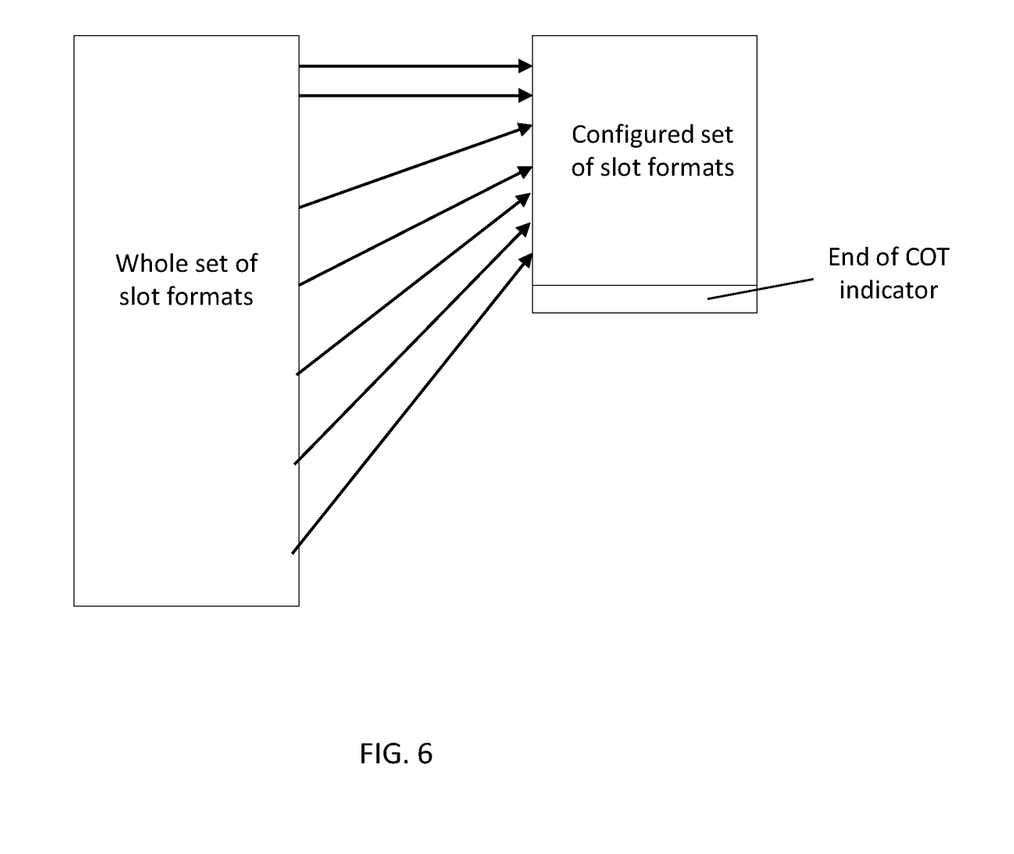
FIG. 6 illustrates another slot format configuration in accordance with some embodiments.

Accordingly, changes to the DCI format 2_0 should be made to enable DCI format 2_0 to support the indication of the size of the COT. As shown in FIG. 4, the subset of potential slot formats may be configured by selecting the sets from the entire set of formats. In this case, all entries may correspond to a specific slot format and thus dynamic indication of the length of the COT may not occur. However, in some embodiments one entry of the configured set of slot formats may be defined as the indication of end of COT. This is shown in FIG. 6, which illustrates a DCI format 2_0 indication in accordance with some embodiments. In FIG. 6, all entries of the configured set of slot formats other than the above specific entry may be selected from the whole set of slot formats. By putting the reserved indication of the end of the COT, the reserved indication can be utilized in the middle of DCI format 2_0 to indicate the COT ending position without changing the actual length DCI format 2_0 size.

For example, in some embodiments index 0, 1, 2, 3, 4, 5, and 6 may be configured as potential different slot formats and index 7 may be configured as the end of COT indicator. Thus, 3 bits may be used to indicate each field in DCI format 2_0. If the COT length is 4 slots with slot format index 1 for all 4 slots, then DCI format 2_0 can indicate 1, 1, 1, 1, 7, X, X, X, X, X assuming that the size of DCI format 2_0 is 30 bits. After indicating 7, dummy bits (X) may be padded fill out the configured size of DCI format 2_0 to 30 bits. Depending on the COT length and size of DCI format 2_0, the padding may be from 0 bits up to a maximum number of bits. The end of COT indicator can be any index of the configured set of slot formats, including index 0 or index 1, or any other index.

Figure 7:
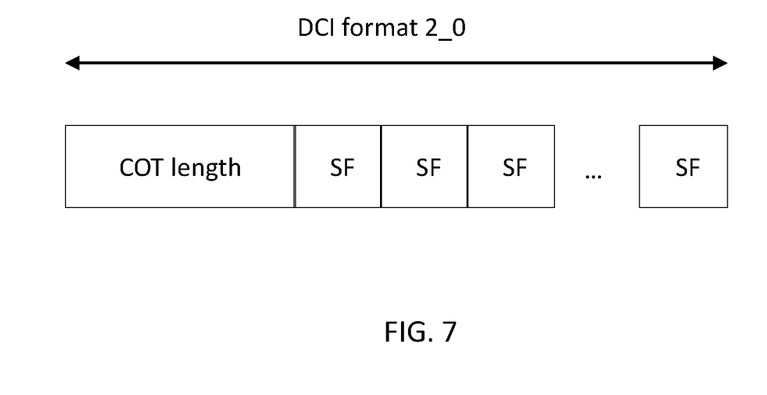
FIG. 7 illustrates a slot format indicator in accordance with some embodiments.

Alternatively, the size of the COT may be supported by DCI format 2_0 by adding a separate field indicating the COT length for the serving cell. FIG. 7 illustrates a slot format indicator in accordance with some embodiments. As shown in FIG. 7, the COT length field, if present, may be disposed before the fields that indicate the subframe formats. In other embodiments, however, the COT length field may be disposed at any point within the DCI format 2_0. The COT field may have a fixed length (non-configurable/single value) or a variable length. When the COT field has a variable length higher layer signaling (such as RRC signaling) may be used to indicate the presence of the COT length field, the location of the COT length field, and the length of the COT length field. The number of slots may be different, dependent on the value of the COT length field. However, the total bit of DCI format 2_0 may not change dynamically, so dummy bit padding may be used in the remaining slot format fields. The length of the COT (the duration) may be the total COT length or may be the COT length remaining from the start or end of the COT length field. The COT length may be in terms of slots, symbols, or any other granularity.

If a UE receives the COT length field, the UE may apply the knowledge about the end-of-COT to enable UL transmission LBT category switching in a gNB-acquired COT. If the COT length field is not present, the UE may use an SFI indication, if available, to determine the end-of-COT.

In another embodiment, DCI format 2_0 may use a separate RNTI for masking the CRC when COT information is indicated by the DCI format 2_0. For a DCI format 2_0 in which the SFI-RNTI is used to mask the CRC of the PDCCH, DCI format 2_0 can be used to indicate the slot format. On the other hand, for a DCI format 2_0 where the COT-RNTI is masked with the CRC of the PDCCH, DCI format 2_0 can be used to indicate the COT information. In this case, the COT-RNTI can be different from the SFI-RNTI. Alternatively, the SFI-RNTI and COT-RNTI may be configured separately but their values may be the same.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus comprising:
   processing circuitry configured to cause a user equipment (UE) to:
   decode downlink control information (DCI) from a base station;
   determine, from a channel occupancy time (COT) field of the downlink control information, COT information of a COT acquired by the base station, wherein the COT information indicates a remaining duration of the COT, wherein the COT field is different from a slot format indication (SFI) field of the DCI;
determine, according to radio resource control (RRC) signaling, a presence of the COT field in the DCI, and a length of the COT field in the DCI; and
communicate data with the base station based on the COT information.

2. The apparatus of claim 1, wherein the DCI is decoded from a physical downlink control channel (PDCCH), wherein the DCI has been formed in accordance with a DCI format, wherein the processing circuitry is further configured to cause the UE to:
determine the COT information from the COT field using the DCI format.

3. The apparatus of claim 2, wherein a cyclic redundancy check (CRC) of the DCI is masked with either COT-Radio Network Temporary Identifier (RNTI) or a slot format indication RNTI, depending on whether or not the DCI format contains the COT field.

4. The apparatus of claim 2, wherein the processing circuitry is further configured to cause the UE to decode higher layer signaling that indicates:
a size of the DCI according to the DCI format,
a number of available slot formats supported by the DCI according to the DCI format, and
a monitoring period of the DCI according to the DCI format.

5. The apparatus of claim 1, wherein the DCI is format 2_0.

6. The apparatus of claim 1, wherein the DCI has a maximum size of 128 bits.

7. The apparatus of claim 1, wherein the DCI includes an indication of one or more frequency sub-bands associated with the remaining duration of the COT.

8. The apparatus of claim 1, further comprising:
a transceiver coupled to the processing circuitry; and
a memory configured to store the COT information.

9. The apparatus of claim 1, wherein the remaining duration of the COT indicates a time between reception of the DCI and an end of the COT.

10. The apparatus of claim 1, wherein the processing circuitry is further configured to cause the UE to:
determine that the COT information is indicated by the DCI based on a result of masking a cyclic redundancy check (CRC) of the DCI with a Radio Network Temporary Identifier (RNTI).

11. The apparatus of claim 1, wherein the base station is a gNodeB of 3GPP 5G New Radio.

12. The apparatus of claim 1, wherein the channel occupancy time (COT) is associated with a channel on an unlicensed band.

13. A user equipment (UE) comprising:
a radio transceiver; and
processing circuitry coupled to the radio transceiver, and configured to:
decode downlink control information (DCI) from a base station;
determine, from a channel occupancy time (COT) field of the downlink control information, COT information of a COT acquired by the base station, wherein the COT information indicates a remaining duration of the COT, wherein the COT field is different from a slot format indication (SFI) field of the DCI;
determine, according to radio resource control (RRC) signaling, a presence of the COT field in the DCI, and a length of the COT field in the DCI; and
communicate data with the base station based on the COT information.

14. An apparatus comprising:
processing circuitry configured to cause a base station to:
engage in a Listen-Before-Talk (LBT) procedure for communication with a user equipment (UE) on an unlicensed band;
acquire a channel in the unlicensed band for a channel occupancy time (COT) based on a successful outcome of the LBT procedure;
encode, for transmission to the UE, a physical downlink control channel (PDCCH) having downlink control information (DCI), wherein the DCI includes a COT field and a slot format indication different from the COT field, wherein the COT field includes COT information indicating a remaining duration of the COT; and
encode, in radio resource control (RRC) signaling, an indication of a presence of the COT field in the DCI and a length of the COT field in the DCI.

15. The apparatus of claim 14, wherein the DCI has been formatted according to a DCI format 2.0.

16. The apparatus of claim 14, wherein the DCI has a maximum length of 128 bits.

17. The apparatus of claim 14, wherein the DCI includes an indication of one or more frequency sub-bands associated with the remaining duration of the COT.

* * * * *